US 6,679,807 B2

(12) United States Patent
Kato et al.

(10) Patent No.: US 6,679,807 B2
(45) Date of Patent: Jan. 20, 2004

(54) VEHICLE DRIVING CONTROL DEVICE AND METHOD

(75) Inventors: Yoshifumi Kato, Nishikamo-gun (JP); Tsumotu Tashiro, Nagoya (JP)

(73) Assignee: Denso Corporation, Kariya (JP)

( * ) Notice: Subject to any disclaimer, the term of this patent is extended or adjusted under 35 U.S.C. 154(b) by 60 days.

(21) Appl. No.: 10/060,415

(22) Filed: Feb. 1, 2002

(65) Prior Publication Data

US 2002/0107106 A1 Aug. 8, 2002

(30) Foreign Application Priority Data

Feb. 2, 2001 (JP) ........................................ 2001-027182

(51) Int. Cl.$^7$ ........................... B60K 41/04; B60K 41/02
(52) U.S. Cl. ........................................ 477/107; 477/181
(58) Field of Search ......................... 477/83, 84, 107, 477/110, 111, 181

(56) References Cited

U.S. PATENT DOCUMENTS

| | | | | |
|---|---|---|---|---|
| 5,507,705 A | * | 4/1996 | Hara ........................... | 477/408 |
| 5,611,754 A | * | 3/1997 | Haga et al. .................. | 477/181 |
| 6,095,945 A | * | 8/2000 | Graf ........................ | 477/110 X |
| 6,165,102 A | * | 12/2000 | Bellinger ................. | 477/181 X |
| 6,306,062 B1 | * | 10/2001 | Toukura et al. ......... | 477/110 X |

FOREIGN PATENT DOCUMENTS

| | | |
|---|---|---|
| JP | 7-47862 | 2/1995 |
| JP | 2000-297672 | 10/2000 |

* cited by examiner

Primary Examiner—Roger Pang
(74) Attorney, Agent, or Firm—Nixon & Vanderhye P.C.

(57) ABSTRACT

An improved vehicle driving control device controls a vehicle without giving vehicle occupants a feeling of abnormality during acceleration and deceleration and optimally controls the operating torque of the engine. A vehicle driving control procedure sets the target operation torque of the vehicle and determines a target engine torque and a target engine speed from the target operation torque. Engine control is performed according to the target parameters. To compute each target parameter of the engine, the target output torque of a torque converter is first computed from the target operation torque, to determine the condition of a lockup clutch. Furthermore, each target parameter is computed in accordance with a control law set in accordance with the condition of the lockup clutch.

34 Claims, 8 Drawing Sheets

VEHICLE DRIVING CONTROL DEVICE AND METHOD

CROSS REFERENCES TO RELATED APPLICATIONS

This application relates to and incorporates herein by reference Japanese patent application no. 2001-27182 filed on Feb. 2, 2001.

BACKGROUND OF THE INVENTION

The present invention relates to a vehicle driving control device for controlling the driving conditions of a vehicle by control of the engine, or control of both the engine and a braking device, independently of the controls performed by the driver.

A conventional control device performs so-called adaptive cruise control (hereafter, simply ACC), an example of which is disclosed in unexamined Japanese application (JP-A) No.7-47862. The conventional control device controls a trailing vehicle to follow a leading vehicle while keeping a safe distance between the vehicles. The control device computes a first target vehicle speed, which is the speed that is required to follow the leading vehicle. Then a target engine torque, which is the torque necessary to maintain the target vehicle speed, is computed for generating a torque command representing the target engine torque for directing the driving speed of the vehicle to the target vehicle speed.

To compute the target engine torque from the target vehicle speed according to the above-described control device, the basic torque of the engine is computed based on the current running resistance of the vehicle (rolling resistance, air resistance, acceleration resistance, and hill-climbing resistance, which is based on vehicle weight and road gradient), the gear ratio of the power train (the gear ratio of the transmission and differential gears), and the torque ratio of a torque converter. Furthermore, a correction of engine torque (correction torque) is computed from the deviation between the target vehicle speed and the actual vehicle speed. Then, the basic torque is corrected by the correction torque.

In the case of the conventional control device, therefore, the actual torque transmission characteristics of the torque converter will not be reflected in the target engine torque, which is the final control target. Also, it is impossible to set an optimum target engine torque for achieving the target vehicle speed during a transition period during which the engine speed is being greatly changed by the engine torque control and there is significant slippage in the torque converter.

The conventional control device uses an instantaneous value of the torque ratio to represent the characteristics of the torque converter when computing the basic torque of the engine. When the torque converter is locked by a lockup device and the engine is running at a steady speed or when the torque converter is in a relatively stable state because of low slippage, a nearly proper basic torque is obtained. However, during a transition period when the engine speed substantially varies or when the torque converter slips significantly, the characteristics of the torque converter cannot be reflected in the basic torque requirement, and it is impossible to optimally set the target engine torque.

Furthermore, in the conventional control device, the target vehicle speed is determined as the target of the ACC control, and the engine torque is set based on the target vehicle speed in performing engine control. Therefore, if an optimum target engine torque for achieving the target vehicle speed could be set, the acceleration of the vehicle resulting from the engine control would disturb the driver and other passengers. That is, according to the laws of motion, torque and acceleration (and deceleration) are proportional, and the target engine torque and the acceleration (and deceleration) of the vehicle correlate. However, in the conventional control device, since the target engine torque is based on the target vehicle speed, which is an integral value of the acceleration (and deceleration) of the vehicle, it is impossible to set a target engine torque that results in comfortable levels of acceleration. For example, when the target vehicle speed is increased in response to acceleration of the leading vehicle, the trailing vehicle will be abruptly accelerated during a transition period until the target vehicle speed is reached, which creates discomfort for the vehicle occupants. Since it takes time to accelerate the vehicle, the behavior of the vehicle will disturb the occupants.

SUMMARY OF THE INVENTION

In view of the above-described problems inherent in known control devices, it is an object of this invention to provide a driving control device that is capable of accelerating and decelerating a vehicle while giving the vehicle occupants a feeling of smooth operation and to optimize the vehicle driving torque of the engine even during a transition period when the engine speed greatly varies and when the slippage of the torque converter is increasing.

To accomplish this object, a target tire operating torque computing means computes the target tire operating torque necessary to operate the vehicle at a predetermined running state on the basis of an input from a sensor that detects the running condition of the vehicle. Then, a driving resistance estimating means estimates the driving resistance of the vehicle on the basis of an input from the sensor.

Then, target turbine torque computing means computes the target turbine torque of the torque converter on the basis of the target tire operating torque, the computed driving resistance, and the gear ratio of the power transmission train. A target engine operating condition computing means computes the target engine torque and the target engine speed by a rule of control set in accordance with the state of the lockup clutch on the basis of the computed turbine torque and the turbine speed of the torque converter.

The engine control means controls the engine in accordance with the result of a computation by the target engine control target computing means so that the engine torque and the engine speed will be directed to the target engine torque and the target engine speed.

In the driving control device of the invention, the target tire operating torque of the vehicle, which is proportional to the acceleration of the vehicle and not proportional to the target vehicle speed, is a control target for controlling the vehicle, and the target engine torque and the target engine speed are set on the basis of the target tire operating torque and the driving resistance. The term acceleration refers to acceleration or deceleration herein.

The target tire operating torque computing means easily sets the target tire operating torque such that the acceleration of the vehicle will not disturb the vehicle occupants. Therefore, the target tire operating torque computing means is a control target setting means.

If the target vehicle speed is set as a control target, as in the conventional driving control device, acceleration of the vehicle occurs when the target vehicle speed is changed. These parameters are not proportional. Therefore, to produce acceleration of the vehicle such that the vehicle occupants will feel no abnormality at a preset target vehicle speed, it is necessary to sample the optimum realizable acceleration of the vehicle and to precisely set, according to each vehicle driving condition, the operation characteristics of a target vehicle speed setting means on the basis of the sampling.

On the other hand, the acceleration α of the vehicle, the tire operating force Ftire [N] occurring at the vehicle tires, and the driving resistance Fload [N] (air resistance, tire rolling resistance, resistance due to the road gradient, and the like), which are applied to the vehicle during running, the mass of the vehicle M1 [kg], and an equivalent mass M2 [kg] for the inertia of rotating members of the vehicle, as shown in FIG. 1(a), can be expressed by the following equation (1) of vehicle motion.

$$(M1+M2)\cdot \alpha = Ftire + Fload \quad (1)$$

From this equation, the acceleration α of the vehicle is proportional to the sum of the tire operating force Ftire, occurring at the vehicle tires, and the driving resistance Fload (the driving resistance Fload is of a negative value). In this invention, because the target tire operating torque, which is computed to direct the vehicle to a predetermined driving condition, is derived from the current driving conditions of the vehicle, the target tire operating torque includes a torque component corresponding to the vehicle driving resistance Fload and a torque component corresponding to the tire operating force Ftire. As a result, the target tire operating torque is proportional to the acceleration α of the vehicle.

Therefore, the target tire operating torque at which the vehicle acceleration is easily controlled without disturbing the vehicle occupants can be easily set by the target tire operating torque computing means using a single control law applicable to all driving conditions. This can be accomplished by setting, as a driving control target, the target tire operating torque of the vehicle, which is proportional to the acceleration of the vehicle. The target tire operating torque computing means can be tuned very easily as compared with the setting means in the conventional driving control device.

Furthermore, according to this invention, the target engine torque and the target engine speed are computed by the target engine control target computing means for producing the target tire operating torque. In the computation of these parameters, a control law that is set in accordance with the state of a lockup clutch is used.

According to this invention, therefore, each of these parameters can be optimized to account for the characteristics of the torque converter. Unlike the conventional control device, therefore, it is possible to control the engine optimally.

That is, in the conventional driving control device, an instantaneous value of the torque ratio is used to represent the characteristics of the torque converter when computing the target engine torque from the target vehicle speed, which is the control target. Therefore, when the engine speed has changed greatly or the torque converter slips significantly because the lockup clutch is disengaged, the target engine torque corresponding to the control target cannot be set. In the present invention, the control law, which has been set according to the state of the lockup clutch, is used in setting the target conditions (target engine torque and target engine speed) of the engine from the target operating torque, which is the control target. Thus it is possible to set the target engine torque and the target engine speed in accordance with the condition of the torque converter. Accordingly, it is also possible to optimally execute the engine control procedure with the engine control means.

The driving control device in one aspect of the invention sets the target engine torque and the target engine speed and then controls the engine accordingly to produce the target tire operating torque that has been set by the target tire operating torque computing means. In one form of the invention, the braking torque for decreasing the vehicle speed is applied only by the engine brake, which results in less control during deceleration of the vehicle.

When a high degree of control, not only during vehicle acceleration but also during vehicle deceleration, is required, the driving control device preferably has the features mentioned below.

In one form, the driving control device is designed to control a vehicle in which a braking device and the engine are controlled independently of the driver's operation. In such a control device, like the driving control device mentioned earlier, the target tire operating torque computing means computes the target tire operating torque of the vehicle necessary to direct the vehicle to a specific driving condition on the basis of information received from sensors that detect the driving conditions of the vehicle. A driving resistance estimating means estimates the driving resistance of the vehicle on the basis of the information from the sensors.

Then, a controlled system selecting means selects either one or both of the engine and the braking device as a controlled system or systems on the basis of the tire operating torque and the driving resistance. When the braking device is selected, a target braking torque computing means computes the target braking torque for computing the target braking torque on the basis of the target tire operating torque and the driving resistance. A brake control means controls the braking device to achieve the computed target braking torque.

According to the control device of this form of the invention, the target tire operating torque set by the target tire operating torque computing means is a negative driving torque (in other words, a braking torque). When the target tire operating torque cannot be applied to the vehicle by the use of engine brake under the engine control, the braking device on the vehicle is driven to apply the target tire operating torque to reach the desired driving conditions.

In the control device of this form of the invention, when the engine is selected as the controlled system, the target engine torque and the target engine speed are computed, as described earlier, according to the state of the lockup clutch.

The target engine control target computing means computes the target engine torque and the target engine speed in accordance with the state of the lockup clutch (engaged or disengaged), which allows these parameters to be optimized according to the characteristics of the torque converter. That is, the target engine control target computing means changes the control law used in the computation of the target engine torque and the target engine speed according to whether the lockup clutch is disengaged or engaged. When the lockup clutch is engaged, the target turbine torque and the turbine speed of the torque converter are set as the target engine torque and the target engine speed.

On the other hand, when the lockup clutch is disengaged, a first target engine speed computing means computes the target engine speed on the basis of the target turbine torque and speed and the torque ratio and capacity factor of the torque converter. Then, the slope of the change of the target engine speed is computed by a target engine speed slope computing means. Subsequently, a first target engine torque is computed by a first target engine torque computing means on the basis of the turbine speed and the target engine speed. A second target engine torque is computed by the second target engine torque computing means on the basis of the target engine speed slope and the inertia of rotating members of the engine. A third target engine torque computing means serves to compute the target engine torque, which is the engine control target, on the basis of the first target engine torque and the second target engine torque.

Accordingly, the target engine condition (the target engine torque and the target engine speed) necessary to produce the target tire operating torque can be set in accordance with the characteristics of the entire power transmission system, including the dynamic characteristics of the torque converter, to optimize the control of the vehicle.

The control law of the target engine control target computing means is determined by the following procedure.

First, as shown by example in FIG. 1(b), the power transmission system includes an automatic transmission, a torque converter, which transmits the rotation of the engine to the input shaft of the automatic transmission, and a differential gear, which transmits the rotation of the output shaft of the automatic transmission to the right and left driving wheels.

In this invention, the target turbine torque computing means computes the target turbine torque Tt, which is the output torque of the torque converter, on the basis of the target tire operating torque, the driving resistance, and the gear ratio of the power transmission train (to be specific, the transmission ratio of the automatic transmission and the differential gears). The target engine control target computing means, therefore, is required only to set, in accordance with the power transmission characteristics of the torque converter, the engine torque Te and the engine speed Ne necessary to produce the target turbine torque Tt.

On the other hand, the power transmission characteristics of the torque converter differ between the engaged and disengaged states of the lockup clutch.

When the lockup clutch is disengaged, the torque converter transmits the rotation of the engine to the automatic transmission according to the power transmission characteristics of the torque converter. However, when the lockup clutch is engaged, that is, when the input shaft and the output shaft of the torque converter are coupled through the lockup clutch, the rotation of the engine is transmitted directly to the automatic transmission through the lockup clutch.

Therefore, it is understood that when the lockup clutch is engaged, the control law for setting the target engine torque and the target engine speed should set the target engine torque and the target engine speed such that the target engine torque Te equals the target turbine torque Tt and such that the target engine speed Ne equals the target engine speed Ne, which equals the turbine speed Nt.

However, when the lockup clutch is disengaged, the rotation of the engine is transmitted to the automatic transmission through the torque converter. Therefore, when setting the target engine torque and the target engine speed, it is necessary to take the power transmission characteristics of the torque converter into consideration.

When the torque converter is operating steadily at a nearly constant engine speed Ne, for example, during constant-speed driving, the engine torque Te can be expressed by the following equation (2), which refers to a capacity factor C(e) of the torque converter and the engine speed Ne. The turbine torque Tt is expressed by the following equation (3), which refers to the torque ratio tr(e) of the torque converter and the engine torque Te.

$$Te=C(e)\cdot Ne^2 \quad (2)$$

$$Tt=tr(e)\cdot Te \quad (3)$$

where the capacity factor C(e) and torque ratio tr(e) of the torque converter are functions of the speed ratio Nt/Ne of the torque converter. Substituting equation (2) in equation (3), the turbine torque Tt is expressed by the following equation (4).

$$Tt=tr(e)\cdot C(e)\cdot Ne^2$$

$$Tt=tr(Nt/Ne)\cdot C(Nt/Ne)\cdot Ne^2 \quad (4)$$

Therefore, from equation (4), the target engine speed Ne for producing the target turbine torque Tr can be determined on the basis of the target turbine torque Tr and the turbine speed Nt (the first target engine speed computing means thus employs this relationship).

To set the target engine speed Ne from the target turbine torque Tt and the turbine speed Nt with the first target engine speed computing means, a two-dimensional map, which is used to set the target engine speed Ne from these two parameters Tt and Nt, is predetermined to apply to the torque converter. The target engine speed Ne may be determined by the use of this two-dimensional map. That is, it is possible to easily set the target engine speed by performing interpolation, in a well-known manner, using the two-dimensional map.

Next, the target turbine torque Te for producing the target turbine torque Tt is set according to equation (2). That is, the target engine torque Te can be set on the basis of the target engine speed Ne and the turbine speed Nt (the first target engine torque computing means employs this relationship).

Equation (2) expresses a relationship among the engine torque Te, the capacity factor C(e), and the engine speed Ne when the torque converter is operating steadily. However, when the engine speed Ne is transient, for example, during vehicle acceleration, a torque fluctuation component must be included in equation (2) due to the change of the engine speed Ne.

The torque fluctuation component can be expressed as a product of multiplication of the inertia Ie of the rotating members of engine and the differential (dNe/dt) of the engine speed Ne. Therefore, the target engine torque Te for realizing the target turbine torque Tt is given by the following equation (5).

$$Te=Ie(dNe/dt)+C(e)\cdot Ne^2 \quad (5)$$

In one aspect of this invention, the slope of the target engine speed, which corresponds to the differential (dNe/dt) of the engine speed Ne, is computed by the target engine speed slope computing means. The second target engine torque computing means computes the second target engine torque, which corresponds to the engine torque fluctuation component, on the basis of the slope of the target engine speed and the inertia of the rotating members of the engine. Furthermore, the third target engine torque computing means determines the final target engine torque to be used to control the engine on the basis of the static target engine torque (the first target engine torque) given by the first target engine torque computing means and the dynamic target engine torque (the second target engine torque) given by the second target engine torque computing means.

The control laws for the computation of the target engine torque and the target engine speed by the target engine control target computing means have been explained. Some vehicles are equipped with a lockup clutch that not only can be engaged and disengaged, but also can be changed to a half-engaged state by a known lockup slippage control procedure. When the present invention is to be applied to such a vehicle, it is desirable that, in addition to the above-described two kinds of control laws, a control law should be set for computing the target engine torque and the target engine speed when the lockup clutch is in the half-engaged position.

To accomplish this, in another aspect of the invention, it is recommended that the target engine control target computing means be provided with a second target engine speed computing means for computing the target engine speed on the basis of the turbine speed and the amount of slippage of the lockup clutch when the lockup clutch is disengaged or is held in the half-engaged position under lockup slippage control.

The reason for the provision of the second target engine speed computing means will be explained below.

First, there are two kinds of lockup slippage control: an acceleration lockup slippage control and a deceleration lockup slippage control.

The acceleration lockup slippage control reduces the slippage of the torque converter by controlling the difference between the engine speed and the turbine speed to about 50 to 100 rpm and improves fuel economy by improving the efficiency of power transmission when the lockup clutch is half-engaged within a range in which the lockup clutch cannot be directly engaged.

The range in which the lockup clutch cannot directly be engaged is generally the low range of vehicle speed (e.g., 60 km/h or lower). Within this range, if the lockup clutch is directly engaged, unnatural sounds, transfer of engine vibration, longitudinal shaking of the vehicle on-off operation of accelerator, and the like may occur.

On the other hand, the deceleration lockup slippage control causes the lockup clutch to operate in a half-engaged position within the low speed range, so that the difference between the engine speed and the turbine speed will be about 50 to 100 rpm. As a result, the fuel economy will be improved.

In either of the acceleration lockup slippage control procedures, the engine speed Ne and the turbine speed Nt are computed to control the lockup clutch engaging force such that the difference between these speeds will be directed to a specific value (i.e., the amount of slippage, due to which Ne>Nt in acceleration lockup slippage control and Ne<Nt in deceleration lockup slippage control).

The acceleration lockup slippage control procedure will be explained below by way of example.

When the acceleration lockup slippage control is normally executed, the difference between the engine speed Ne and the turbine speed Nt (Ne−Nt) is controlled to the specific amount of slippage Δ(Δ=50 to 100 rpm).

Considering that, under the condition given above, the normal engine speed Ne is 1500 rpm or greater, the speed ratio of the torque converter (Nt/Ne) is given by the following equation (6), and the capacity factor of the torque converter at this time can be approximated as zero.

$$Nt/Ne=(1500-100)/1500=93\% \qquad (6)$$

Therefore, the torque to be transmitted from the engine to the automatic transmission is the transmission torque Tl of the lockup clutch, which will present no problem in practical use.

On the other hand, let Tin (Tin=C(e)·NE$^2$) be the input torque of the torque converter as shown in FIG. 1(b), and the motions of the engine, torque converter, and lockup clutch in the slippage lockup conditions will be given by equations (7) and (8).

$$Te=Ie(dNe/dt)+Tl+Tin \qquad (7)$$
$$Tt=tr(e)\cdot Tin+Tl \qquad (8)$$

Since the capacity factor C(e) can be approximated as zero, as described above, the input torque Tin will be zero in equations (7) and (8). Furthermore, in the steady state, the target engine speed slope (dNe/dt) in equation (7) also will become zero. Consequently, equations (7) and (8) will simplify to Te=Tl and Tt=Tl respectively.

Consequently, the engine torque Te, the transmission torque Tl of the lockup clutch, and the turbine torque Tt will become equal (Te=Tl=Tt).

Therefore, when the lockup clutch is engaged or is held in the half-engaged position by the lockup slippage control, the target turbine torque may be set as the target engine torque. Therefore it is unnecessary to provide a control law for setting the target engine torque.

On the other hand, the lockup slippage control controls the lockup clutch engaging force Fl to direct the difference between the engine speed Ne and the turbine speed Nt to the specific amount of slippage Δ. Therefore, when the lockup clutch is controlled to be in the half-engaged state by the lockup slippage control, the target engine speed Ne can be calculated from the turbine speed Nt and the amount of slippage Δ of the lockup clutch.

To be more specific, when acceleration lockup slippage control is being executed, the target engine speed Ne is given by Ne=Nt +Δ. When deceleration lockup slippage control is being executed, the target engine speed Ne can be given by Ne=Nt−Δ.

In one aspect of the invention, when the lockup clutch is half-engaged position by the lockup slippage control procedure, the target engine speed is computed by the second target engine speed computing means on the basis of the turbine speed and the amount of slippage of the lockup clutch.

In one aspect of the invention, therefore, the target engine torque and the target engine speed can be optimized in accordance with the state of the torque converter. In this manner, it is possible to optimize the engine control of a vehicle that performs lockup slippage control.

The engine control means executes engine control on the basis of the target engine torque and the target engine speed, which have been determined by the target engine control target computing means. At least one of the target fuel injection quantity and the target throttle angle is computed as the controlled variable of the engine on the basis of the target engine torque and the target engine speed. It is recommended, therefore, that the engine be controlled in accordance with the computed controlled variable.

The driving control device of this invention is applicable not only to adaptive cruise control (ACC), which is for controlling a vehicle to follow a leading vehicle, but to controls other than ACC, such as vehicle stability control (hereafter simply VSC) for stabilizing a vehicle during a turn, braking slippage control (hereafter simply ABS (Anti-lock Brakes)) for limiting wheel slippage while braking, acceleration slippage control (so-called traction control, hereafter simply TRC) for limiting vehicle wheel slippage during acceleration, and constant-speed driving control (hereafter simply constant-speed CC (Cruise Control)) for constant-speed driving.

A plurality of driving control devices for executing such driving controls are often mounted on one vehicle. If, however, this invention is applied to every vehicle-mounted driving control device, it is conceivable that the target engine torque and the target engine speed, or the target brake torque, will be set by each control procedure if a plurality of driving control are executed at the same time, and the controlled variables for actual engine or brake control will not be optimized.

Furthermore, in such a case, there will be computing means for computing the target engine torque, the target engine speed, or the target brake torque by each driving control device. Therefore, there will be much waste, which adds to the cost of the vehicle.

Therefore, in one aspect of this invention, the target tire operating torque computing means is provided with a computing block for computing a target tire operating torque for accomplishing various different driving control procedures (the driving control procedures described above). From among a plurality of target tire operating torques inputted from various computing blocks, which correspond to the various control procedures, the target tire operating torque that has the highest priority under the current vehicle driving conditions is selected as the final target operating torque to be used for control according to predetermined conditions.

That is, according to the driving control device of this invention, a plurality of driving control procedures, such as ACC, VSC and ABS, can be accomplished by a single driving control device. The driving control device of this invention, therefore, simplifies the control system and reduces vehicle cost compared with a vehicle that has a plurality of driving control devices for respectively executing the various driving control procedures.

Furthermore, in the target tire operating torque computing means, the highest priority target tire operating torque is selected from the target tire operating torque determined by a plurality of computing blocks for the respective control procedures. It is therefore possible to efficiently set the control target of the engine, or the engine and braking device, and to employ the control target without a response delay.

Furthermore, another aspect of the invention is an integral control device for integral control of the vehicle operation. The computing block that computes the target tire operating torque for every driving control procedure can be independent of other computing blocks. It is therefore easier to design the control device, which lowers costs.

The target tire operating torque computing means selects the highest priority target tire operating torque. However, when the computing block that has the highest priority changes, the target tire operating torque will suddenly change. Therefore, in another aspect of the invention, when a new target tire operating torque is selected, the target tire operating torque computing means will preferably correct the newly selected target tire operating torque to create a smooth transition between the old target tire operating torque and the new target tire operating torque.

The target tire operating torque computing means is provided, as stated above, with a plurality of computing blocks for computing the target tire operating torque for various kinds of driving control procedures. Thus, in another aspect of the invention, one of the computing blocks is preferably for estimating the target tire operating torque needed by the driver on the basis of the position of the accelerator pedal and the vehicle speed. It is preferred that further computing blocks be for VSC, ABS, TRC, constant-speed CC, and for ACC, respectively.

That is, in this aspect of the invention, the target tire operating torque computing means includes a computing block, in addition to the computing blocks for performing various driving control procedures, for executing driving control based on the accelerator position. The driving control device is thus capable of optimally controlling the vehicle operation and of responding to the driver's demands.

The target turbine torque is computed in the process for setting the final engine control variable from the target tire operating torque. In the computation of the target turbine torque, the driving resistance of the vehicle is used, in addition to the target tire operating torque and the gear ratio of the power transmission train, for the following reason.

The target tire operating torque is computed as the torque required for gaining a desired operation state assuming that the vehicle has a predetermined weight and is running on a flat road. However, the driving resistance Fload shown in FIG. 1(a) varies with changes in the road gradient such as upward and downward slopes and with changes in the weight of the vehicle. Therefore, in the computation of the target turbine torque, if the driving resistance Fload varies, it is necessary to correct the torque component of the target tire operating torque corresponding to the driving resistance Fload for the purpose of achieving the desired driving condition.

If such a correction is automatically performed by the first computing block to achieve the target tire operating torque on the basis of the driver's operation of the accelerator, the vehicle will respond the same way to the position of the accelerator regardless of the road gradient and the vehicle weight. Generally, however, the behavior of a vehicle normally varies when the road gradient or the weight changes. Thus, the driver, when perceiving changes in the road gradient or vehicle weight, will change his or her driving. Therefore, automatic correction of the driving resistance in relation to the target tire operating torque that relates to the accelerator position is sometimes disturbing to the driver.

Thus, preferably, at least when the target tire operating torque based on the accelerator position has been selected as the final target tire operating torque by the target tire operating torque computing means, the target turbine torque computing means computes the target turbine torque on the basis of the selected target tire operating torque and the gear ratio of the power transmission train. Also, in this case, the driving resistance is preferably not used in the computation of the target turbine torque.

In another aspect of the invention, the target tire operating torque computing means is provided with a computing block for computing the target tire operating torque for ACC. Using the computing block, the target acceleration computing means computes the target acceleration of the vehicle necessary to follow the leading vehicle, on the basis of an input fed from the front recognition sensor, which detects the leading vehicle. The target acceleration is converted to the target tire operating torque by a conversion means, to set the target tire operating torque necessary to follow the leading vehicle.

Therefore, according to another aspect of the invention, the acceleration of the trailing vehicle can be optimally controlled, which allows the trailing vehicle to follow the leading vehicle, while keeping a proper distance between the two vehicles.

The correction of the target tire operating torque is computed on the basis of the target acceleration and the actual acceleration of the vehicle by the torque correction computing means, to correct the current target tire operating torque by the given correction and to set the final target tire operating torque.

The torque correction computing means is preferably constructed to evaluate at least a deviation between the target acceleration and the actual acceleration of the vehicle and an integral of this deviation. The torque correction computing means preferably sums values obtained by multiplying the deviation and the deviation integral by a proportionality constant and an integration constant (so-called proportional integral control action) to compute the torque correction.

In engine control and brake control, it is a general practice to set an upper limit (or a lower limit) for controlled variables of the engine and the braking device. Therefore, the engine control means, or both the engine control means and the brake control means, may include limiting means for performing this task.

However, if the limiting means is added to the engine control means (or the engine control means and the brake control means), the torque correction computing means will sometimes operate to increase the deviation integral by the proportional integral control action when the limiting means is functioning.

After the deviation integral is updated in a manner that increases the controlled variable, the controlled variable will remain greater than the upper limit for some period if the relationship of great and small between the target acceleration and the actual acceleration of the vehicle is reversed. In this state, the actual acceleration of the vehicle will continue, giving the vehicle occupants a feeling that something is abnormal.

A similar situation occurs when a device controlled by the control variable of the engine (or of the braking device) has reached a physical limit. That is, for example, when the engine brake is selected to decelerate the vehicle, an engine braking force is produced by, for example, closing the throttle valve. At this time, when the actual deceleration does not reach the target deceleration although the throttle valve is fully closed (i.e., when the throttle valve has reached a physical limit), the deviation integral will be updated in a manner that causes the controlled variable to exceed a value corresponding to the physical limit due to the proportional integral control procedure. Therefore, even when the target acceleration becomes positive, the throttle valve will be held fully closed for some period, which delays acceleration and gives the passengers a feeling of abnormality.

Therefore, in one aspect of the invention, when the torque correction computes the torque correction by the proportional integral control procedure, and when the engine control means (or the engine control means and brake control means) is provided with limiting means for setting a limit on the control variable or when the engine (or the braking device) has a physical limitation, it is preferred to provide the conversion means with a deviation integration prohibiting means for prohibiting the deviation integral value from being updated in a manner that would cause the control variable to surpass the set limit or to surpass a value corresponding to the physical limit.

DESCRIPTION OF THE PREFERRED EMBODIMENTS

Figure 1A:
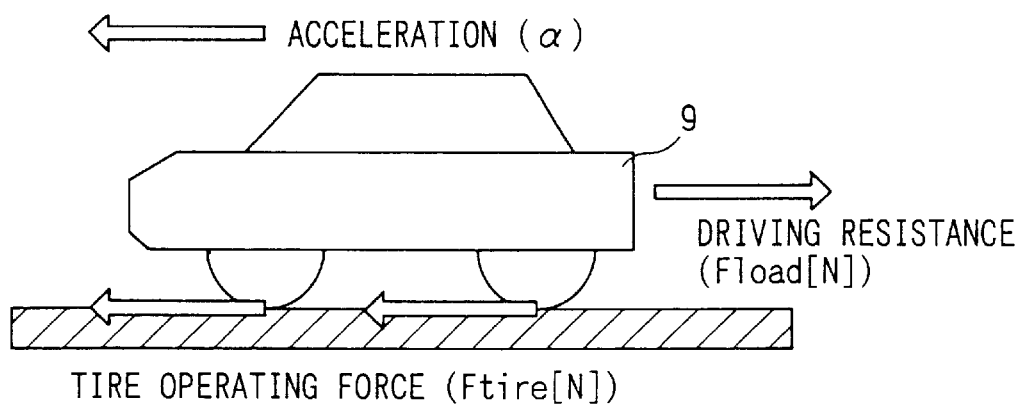
FIGS. 1A and 1B provide a diagram illustrating an equation of motion of a vehicle and a vehicle path.
Figure 1B:
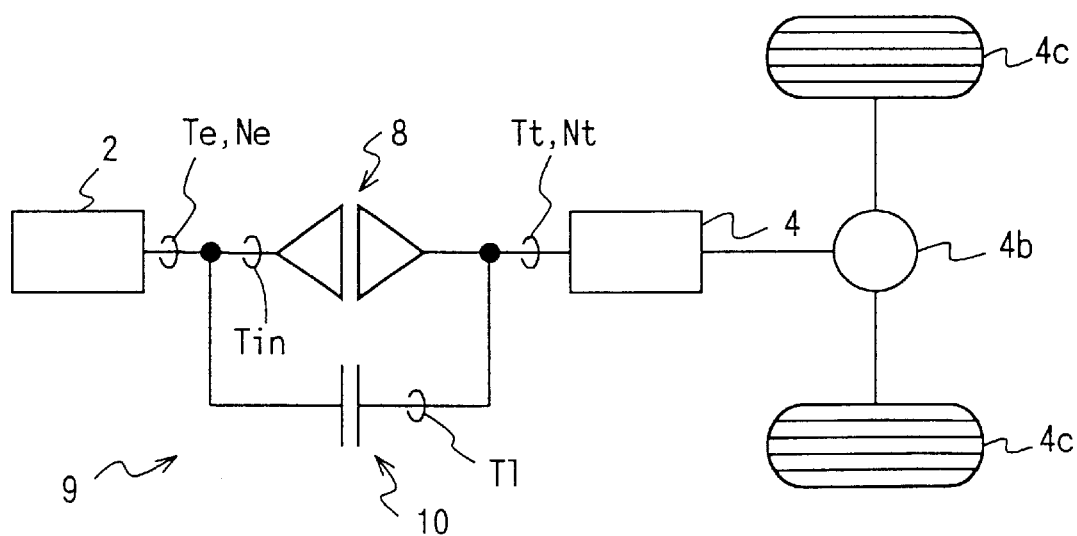
Figure 2:
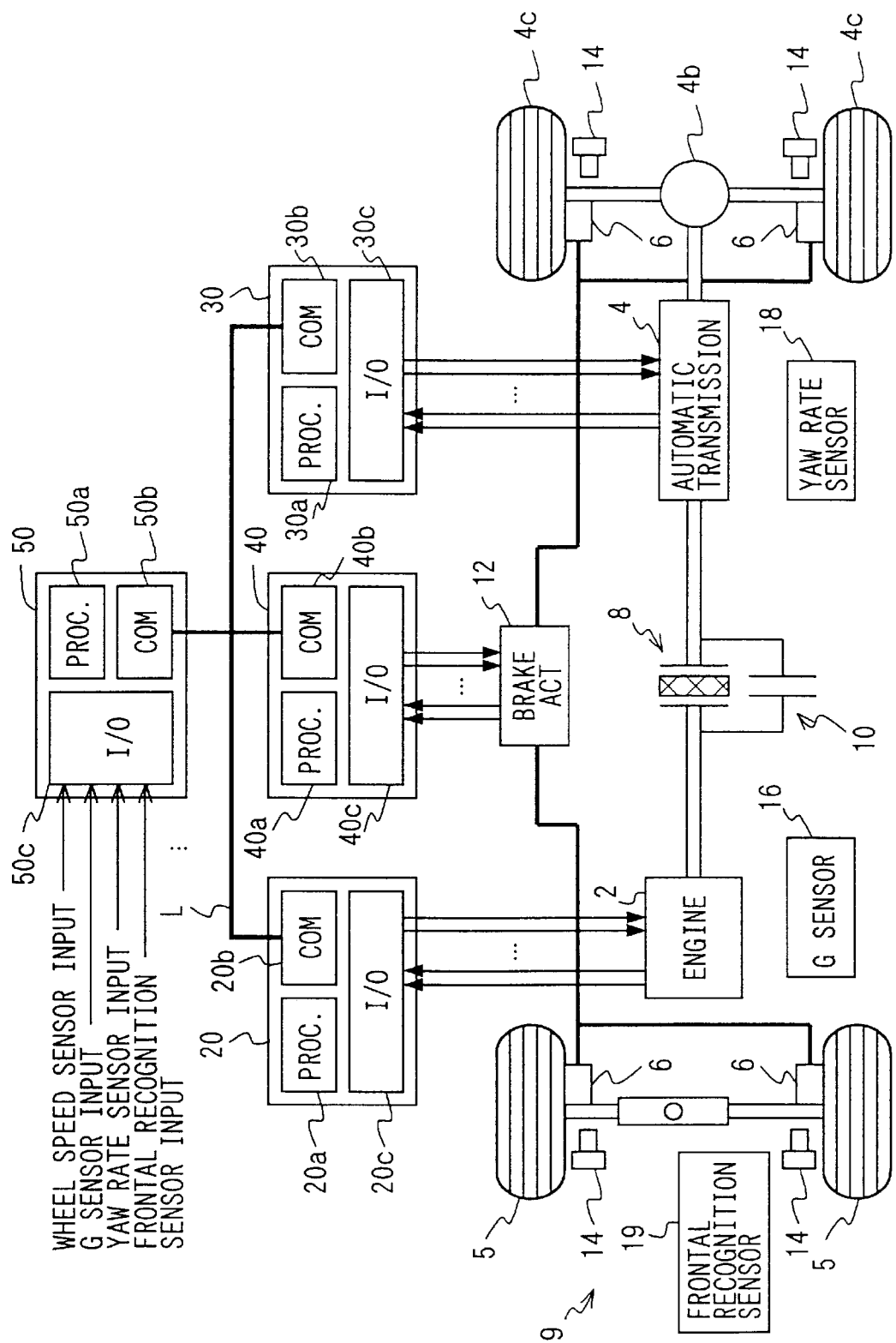
FIG. 2 is a block diagram illustrating one embodiment of a driving control device.

Embodiments of this invention will hereinafter be explained with reference to the accompanying drawings.

The vehicle driving control device of this embodiment is for integrated control of an engine 2, an automatic transmission 4, and brakes 6 of right and left driving wheels 4c (rear wheels) and right and left idler wheels 5 (front wheels), which are components of a device for controlling the driving condition of the vehicle (a rear-wheel-drive vehicle 9 in this embodiment). A differential 4b transfers torque from the automatic transmission 4 to the rear wheels 4c. The driving control device is equipped with an engine ECU 20 for controlling the engine 2, an ATECU 30 for controlling the automatic transmission 4, which includes a lockup clutch 10 of a torque converter 8, and a brake ECU 40 for controlling the braking device 6 of each wheel through a brake actuator (brake ACT) 12. Furthermore, a manager ECU 50 provides a control guideline for each of the engine, the ATECU and the brake to each of the ECUs 20, 30 and 40.

The ECUs 20, 30, 40 and 50 are independent electronic control units, each having process devices 20a, 30a, 40a and 50a and each including a microcomputer. The ECUs 20, 30, 40 and 50 incorporate built-in communications devices 20b, 30b, 40b and 50b, respectively, which are mutually connected through data communication lines L. Mutual transmission and reception of driving control data are effected through the communication devices 20b, 30b, 40b and 50b and the communication lines L.

The engine ECU 20, the ATECU 30, and the brake ECU 40 control the engine 2, the automatic transmission 4, which includes the lockup clutch 10, and the brake ACT 12 (and accordingly, the braking device 6 of each wheel), respectively. Therefore, the ECUs 20, 30, and 40 are provided with built-in signal input-output sections 20c, 30c, and 40c for receiving detection signals from the sensors that detect the conditions of the controlled systems and for sending command signals to the brake ACT 12 and actuators that are incorporated into the engine and the automatic transmission 4.

Sensors for detecting vehicle driving conditions are mounted on the vehicle 9. The sensors include a vehicle wheel speed sensor 14 for detecting the rotational speed of each vehicle wheel (wheel speed), an acceleration sensor (G sensor) 16 for detecting the acceleration of the vehicle 9, a yaw rate sensor 18 for detecting the angular velocity around the central axis of the vehicle 9, and a front recognition sensor 19 for detecting a leading vehicle and detecting the distance between the vehicles. The detection signals from the sensors 14, 16, 18 and 19 are sent to the manager ECU 50. The manager ECU 50 receives the detection signals through the signal input section 50c.

Figure 3:
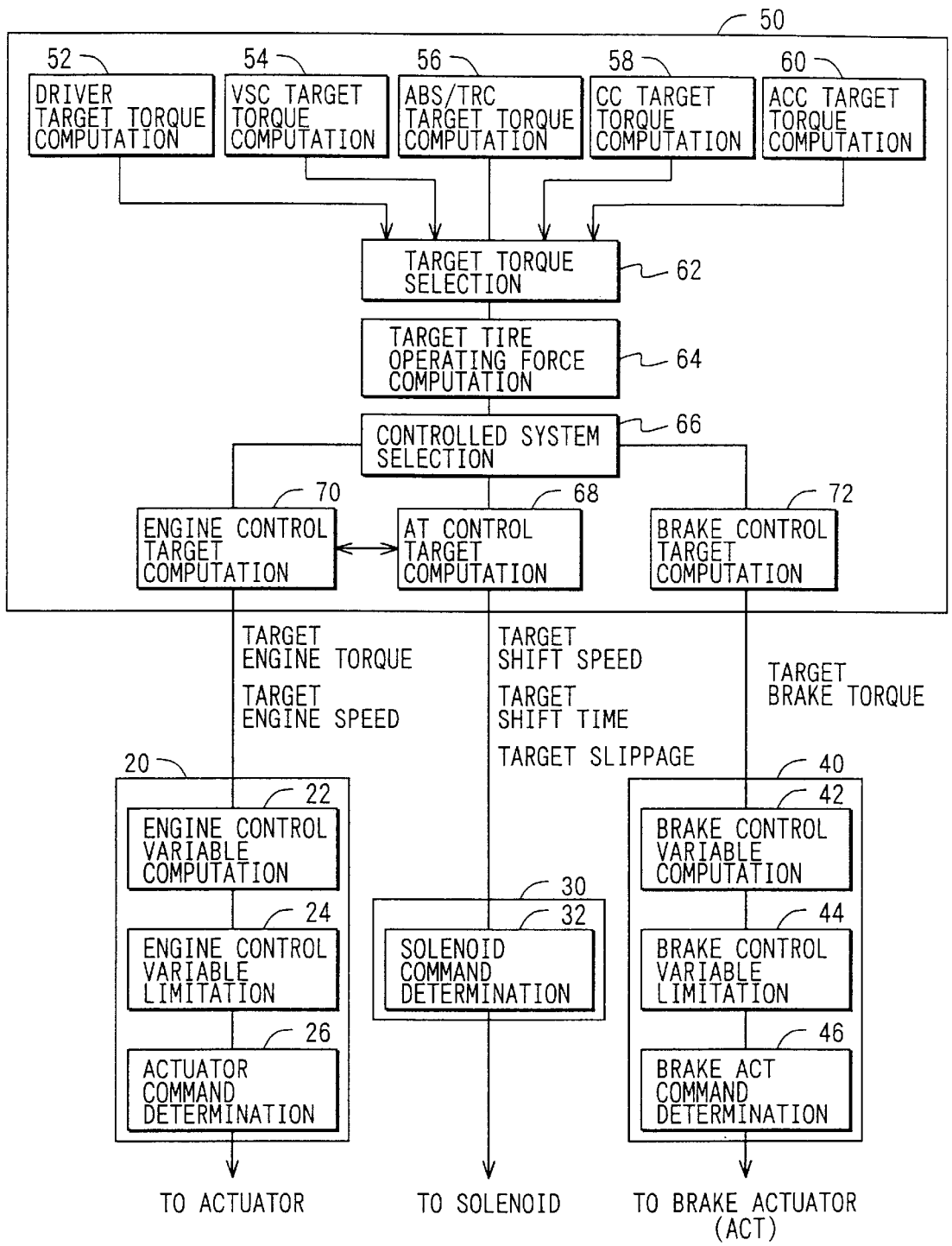
FIG. 3 is a functional block diagram illustrating control steps executed by each ECU of the driving control device of FIG. 2.

The following describes the steps performed by the ECUs 20, 30, 40 and 50. The manager ECU 50, which is shown in FIG. 3, executes five target operation torque computing sections 52, 54, 56, 58 and 60. These sections correspond to target operation torque computing means for computing the target operation torque of the vehicle 9 on the basis of the detection signals fed from the sensors (the vehicle wheel speed sensor 14, the G sensor 16, the yaw rate sensor 18, the front recognition sensor 19, and the like), which detect the vehicle driving conditions.

Of the five target operation torque computing sections 52 to 60, the first target operation torque computing section 52 corresponds to a first computing block that computes the target operation torque requested by the driver on the basis of the position of the accelerator pedal and the vehicle speed.

The second target operation torque computing section 54 corresponds to a second computing block that computes the target operation torque for vehicle driving stability control (VSC). The third target operation torque computing section 56 is for computing the target operation torque for performing slippage control (ABS and TRC) for restraining wheel slippage during braking and during vehicle acceleration. The third target operation torque computing section 56 corresponds to third and fourth computing blocks.

The second and third target operation torque computing sections 54 and 56 constantly monitor the vehicle driving conditions on the basis of signals from the sensors and determine and output a target operation torque for preventing vehicle skidding and wheel slippage.

The fourth target operation torque computing section 58 computes a target operation torque for constant-speed driving control (constant-speed CC) when the vehicle driving mode has been set by the driver to a constant-speed driving mode. The fourth target computing section corresponds to a fifth computing block.

The fifth target operation torque computing section 60 computes the target operation torque for controlling the vehicle 9 to follow a leading vehicle when the vehicle driving mode has been set to the ACC mode by the driver. The fifth computing section 60 corresponds to a sixth computing block.

The target operation torques computed by the target operation torque computing sections 52 to 60 are sent to a target operation torque selecting section 62, which is shown in FIG. 3.

The target operation torque selecting section 62 selects, from among the plurality of target operation torques, the highest priority target operation torque as the target operation torque to be used in driving control, according to the current vehicle driving condition and in accordance with preset conditions when the various target operation torques are computed simultaneously at the target operation torque computing sections 52 to 60. The selected target operation torque is sent to a target operation force computing section 64, which is shown in FIG. 3.

In the target operation torque selecting section 62, a correction is set on the basis of the difference between the newly selected target operation torque and the previously selected, or existing, target operation torque, so that the target operation torque sent to the target operation force computing section 64 will not suddenly change when the selected target operation torque changes significantly from the previous target operation torque. Thus the newly selected target operation torque is corrected, and the correction is gradually decreased, to provide a smooth transition between the new target operation torque and the old target operation torque.

Figure 4:
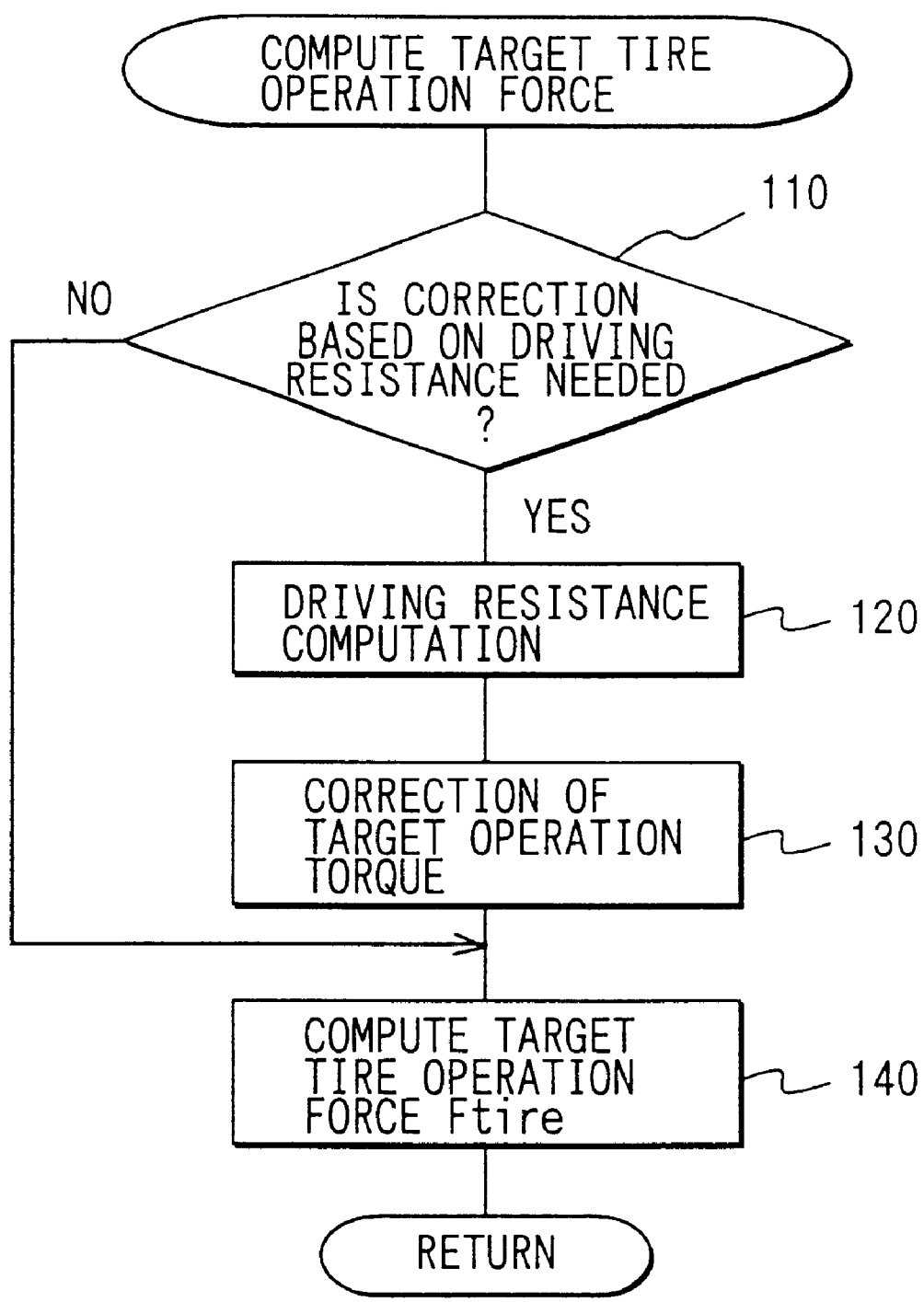
FIG. 4 is a flowchart representing steps executed by a target operation force computing section of FIG. 3.

The target operation force computing section 64 converts the target operation torque selected by the target operation torque selecting section 62 into a target operation force (target operation force Ftire). For example, the target operation force Ftire is computed according to the flowchart shown in FIG. 4.

That is, the target operation force computing section 64 decides, at step 110, whether or not the target operation torque selected by the target operation torque selecting section 62 is the target operation torque required by the driver and determined by the first target operation torque computing section 52. This is to determine whether it is necessary to correct the target operation torque.

If the target operation torque selected by the target operation torque selecting section 62 is the target torque requested by the driver, it is determined that the target operation torque needs no correction, and step 140 is performed. If the target operation torque is not the target operation torque required by the driver, it is determined that the driving resistance needs to be corrected, and step 120 is performed.

At 120, the driving resistance is computed on the basis of the vehicle speed and the road gradient by a driving resistance estimating means. After this step, the target operation torque is corrected, at step 130, based on the driving resistance. Then, step 140, in which the target operation force Ftire is computed from the target operation torque, is performed.

That is, the target operation torques determined by the target operation torque computing sections 52 to 60 control the vehicle acceleration to a value suitable for the current vehicle driving conditions. Therefore, each target operation torque includes a driving resistance component. To accurately determine the operation force required to produce the suitable acceleration value from the target operation torque, it is necessary to reduce, or correct, the target operation torque by a value corresponding to the driving resistance, before converting the target torque into the target operation force.

In the target tire target operation torque computing section 64, basically, the driving resistance is computed at step 120, and the target operation torque is corrected at step 130. Then, at step 140, the target operation torque is converted to the target operation force.

Of the target operation torques determined by the target operation torque computing sections 52, 54, 56, 58 and 60, the target operation torque based on the position of the accelerator pedal directly reflects the driving torque requested by the driver. Therefore, if the correction based on the driving resistance (step 130) is always performed on each of the target operation torques, the behavior of the vehicle 9 in relation to the driver's accelerator operation will not vary despite changes in the road gradient and the vehicle weight. Thus, the driver might not notice changes in the road surface and the vehicle weight.

In the target operation force computing section 64, therefore, when the target operation force is determined from the target operation torque, the type of the target operation torque is determined at step 110. If, the target operation torque is that requested by the driver (from the first target operation torque computing section 52), no correction based on the driving resistance is performed.

Next, the target operation force generated by the target operation force computing section 64 is sent to a system selecting section 66, which is shown in FIG. 3. The system selecting section 66 is for selecting any of the engine 2, the automatic transmission 4, and the braking device 6 as the system or systems that will be used to control the operation force to the target operation force. For example, when the value of the target operation force is positive (i.e., a driving force) for accelerating the vehicle 9, the braking device 6 is not needed. Therefore, the engine 2 and the automatic transmission 4 will be selected as the systems used in the driving control procedure.

When the value of the target operation force is negative (i.e., a braking force) for decelerating the vehicle 9, the system used for the driving control procedure is determined on the basis of the magnitude of the braking force, by determining whether the braking force should be produced by the engine brake, the braking device 6, or a combination of the engine brake and the braking device 6, or by down-shifting the automatic transmission 4. The system selecting section 66 forms a system selecting means.

Upon selecting the system or systems to be used in the driving control procedure, the system selecting section 66 sends a command to determine the control target to the corresponding control target computing section or sections associated with the selected system or systems (engine control target computing section 70, AT (automatic transmission) control target computing section 68, and brake control target computing section 72). For example, a command for the operation force to be produced by the engine 2 and the braking device 6 is given to the engine control target computing section 70 and the brake control target computing section 72, and a down-shift command is given to the AT control target computing section 68.

Next, the AT target computing section 68 computes the target speed of the automatic transmission 4, the target speed change time, which is the target time for the speed to reach the target speed, and the state of the lockup clutch 10 (engaged or disengaged) or the target amount of slippage for controlling the lockup slippage. This computation is performed in response to a command from the system selection section 66 and information such as the engine speed and the engine torque, which comes from the engine control target computing section 70. The result of computation is sent to the ATECU 30.

The ATECU 30 is provided with a solenoid command output section 32, which computes a command value that is sent to a shift control solenoid incorporated in the automatic transmission 4 and to a solenoid for driving the lockup clutch 10 on the basis of a command (target shift speed, target shift time, target slippage, etc.) from the AT control target computing section 68. The solenoid command output section 32 generates a driving signal corresponding to the computed command value and sends the driving signal to the solenoids of the automatic transmission 4 and the lockup clutch 10, to control the shift speed of the automatic transmission 4 and the engagement state or the amount of slippage of the lockup clutch 10.

Figure 5:
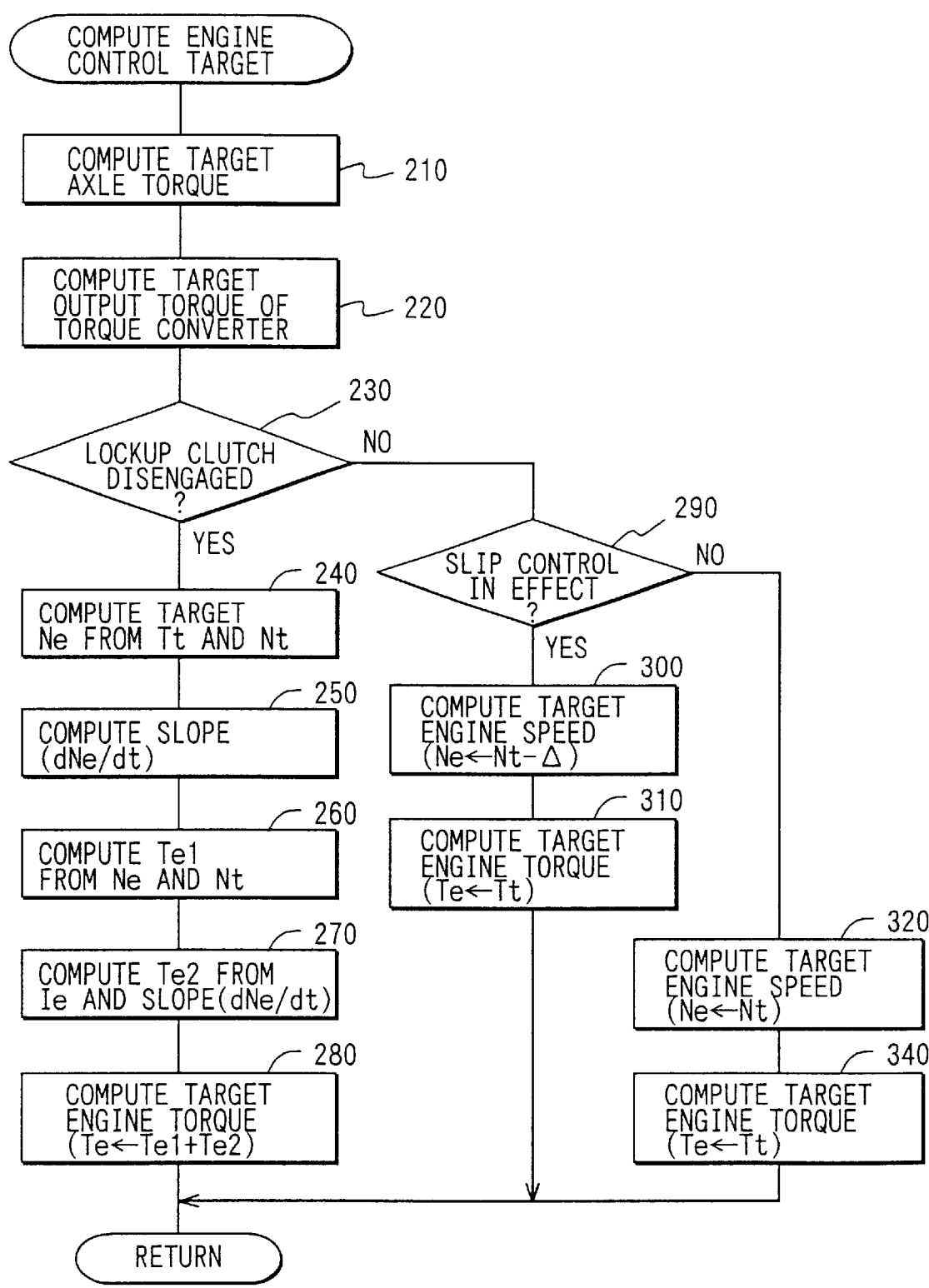
FIG. 5 is a flowchart illustrating steps executed by an engine control target computing section of FIG. 3.

Next, the engine control target computing section 70 computes an engine control target according to the flowchart shown in FIG. 5. In this procedure, the engine control target computing section 70 computes the target engine torque and the target engine speed necessary for producing the operation force according to a command from the system selecting section 66.

That is, at step 210 of FIG. 5, the target axle torque is computed from the operation force instructed by the system selecting section 66. At step 220, the target turbine torque Tt, or target output torque, of the torque converter is computed from the target axle torque and the gear ratio of the power transmission train (the gear ratio of the automatic transmission 4 is given by the AT control target computing section 68).

At step 230, the engagement state of the lockup clutch 10 is read from the AT control target computing section 68. This determines whether the lockup clutch is disengaged. When the lockup clutch 10 is disengaged, a series of steps from step 240 to step 280 are carried out to compute the target engine torque Te and the target engine speed Ne in accordance with a control law that applies when the lockup clutch is disengaged.

Figure 6:
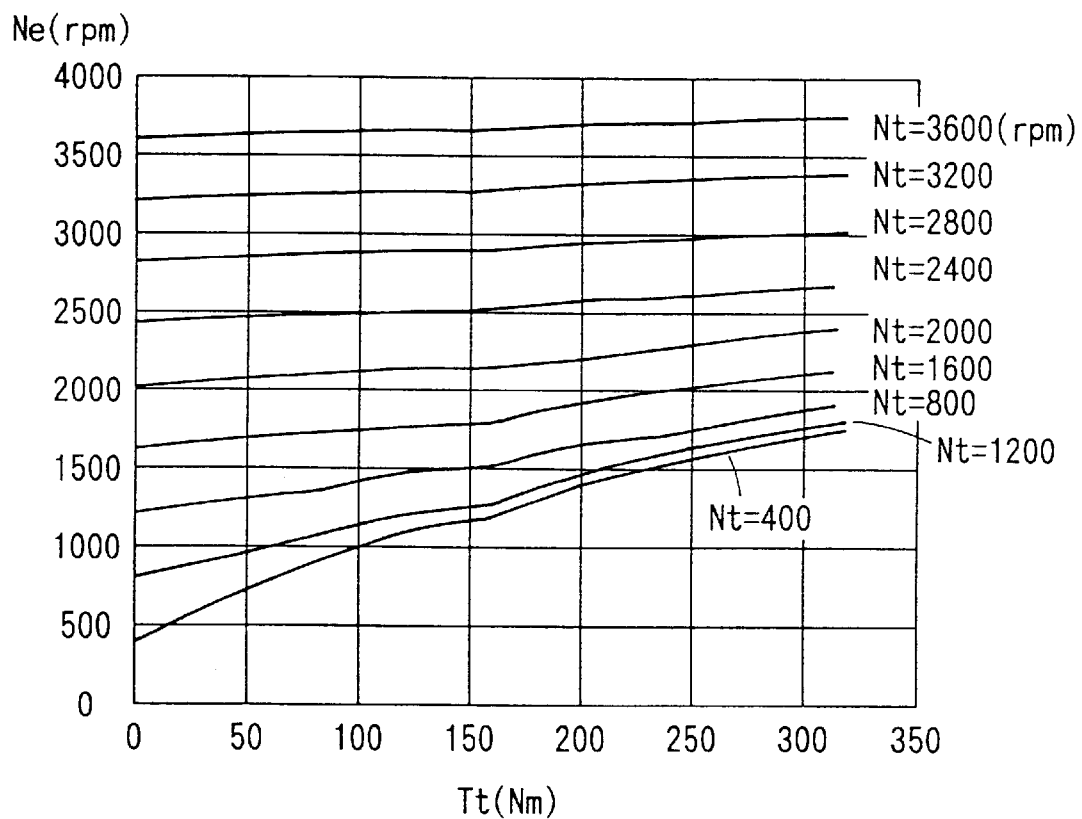
FIG. 6 is a map used to determine a target engine speed Ne from a target turbine torque Tt and a turbine speed Nt.

That is, when the lockup clutch 10 is disengaged, at step 240, a process is executed by the first target engine speed computing means for computing the target engine speed Ne on the basis of the target turbine torque Tt determined at step 220 and the turbine speed Nt gained from the AT control target computing section 68 by using the map shown in FIG. 6. At step 250, a target engine speed slope computing means computes the slope, or gradient, of the change in the target engine speed Ne (corresponding to dNe/dt in equation (5)) from a plurality of target engine speeds Ne previously computed at various times from step 240.

At step 260, a process is executed by a first target engine torque computing means for computing the first target engine torque Te1, which corresponds to the second term on the right side of equation (5), on the basis of the target engine speed Ne and the turbine speed Nt determined at step 240. Furthermore, at step 270 a process is executed by a second target engine torque computing section for computing the second target engine torque Te2, which corresponds to the first term on the right side of equation (5), on the basis of the slope of the change (dNe/dt) in the target engine speed Ne determined at step 250 and the inertia Ie of the engine rotating members.

Then, at step 280, a process is executed by a third target engine torque computing means, to compute the final target engine torque Te by adding the first target engine torque Te1 determined at step 260 and the second target engine torque Te2 determined at step 270, and this ends the process.

At step 230, when the lockup clutch 10 is determined to be engaged (an engaged position or a half-engaged position according to the lockup slippage control), step 290 is performed. In step 290, the AT control target computing section 68 determines whether or not lockup slippage control is being performed.

Then at step 290, when it is decided that the AT control target computing section 68 is performing lockup slippage control, step 300 is performed by a second target engine speed computing means. At step 300 the target engine speed Ne is computed by subtracting the amount of slippage Δ of the lockup clutch 10 from the turbine speed Nt. At step 310, the target turbine torque Tt is set as the target engine torque Te, and then the process stops.

Furthermore at step 290, when it is decided that lockup slippage control is not being performed by the AT control target computing section 68 (i.e., when the lockup clutch 10 is engaged), at step 320, the turbine speed Nt is set as the target engine speed Ne. At the subsequent step (step 340), the target turbine torque Tt is set as the target engine torque Te, and then the process stops.

The process of step 240 to step 280, step 300, step 310, step 320 and step 340 correspond to a target engine control target computing means. A target turbine torque computing means corresponds to step 210 and step 220, which are performed by the engine control target computing section 70, and by the system selecting section 66, which gives a command to the target operation force computing section 64 regarding the operation force to be produced by the engine control so that the target operation force will be computed from the target operation torque. Also, the system selecting section 66 issues a command to the engine control target computing section 70 based on the target operation force.

Next, the target engine torque and the target engine speed determined by the engine control target computing section 70, as previously described, are sent to the engine ECU 20, or the engine control means.

The engine ECU 20 is provided with the following: the engine control variable computing section 22, which computes the controlled variable (in the present embodiment, the target throttle angle TVO) of the engine 2 for directing the engine to the target engine torque and the target engine speed received from the engine control target computing section 70; a controlled variable limiting section 24, which limits the target throttle valve position, or angle TVO, computed by the engine control variable computing section 22 to the specific upper limit value or less to prevent the vehicle 9 from running away, which might otherwise be caused by a malfunction of the control system; and an actuator command output section 26, which computes a command value for driving a throttle actuator of the engine in accordance with the target throttle angle TVO the upper limit of which is limited by the controlled variable limiting section 24, and outputs a driving signal corresponding to a command value to the throttle actuator.

Figure 7:
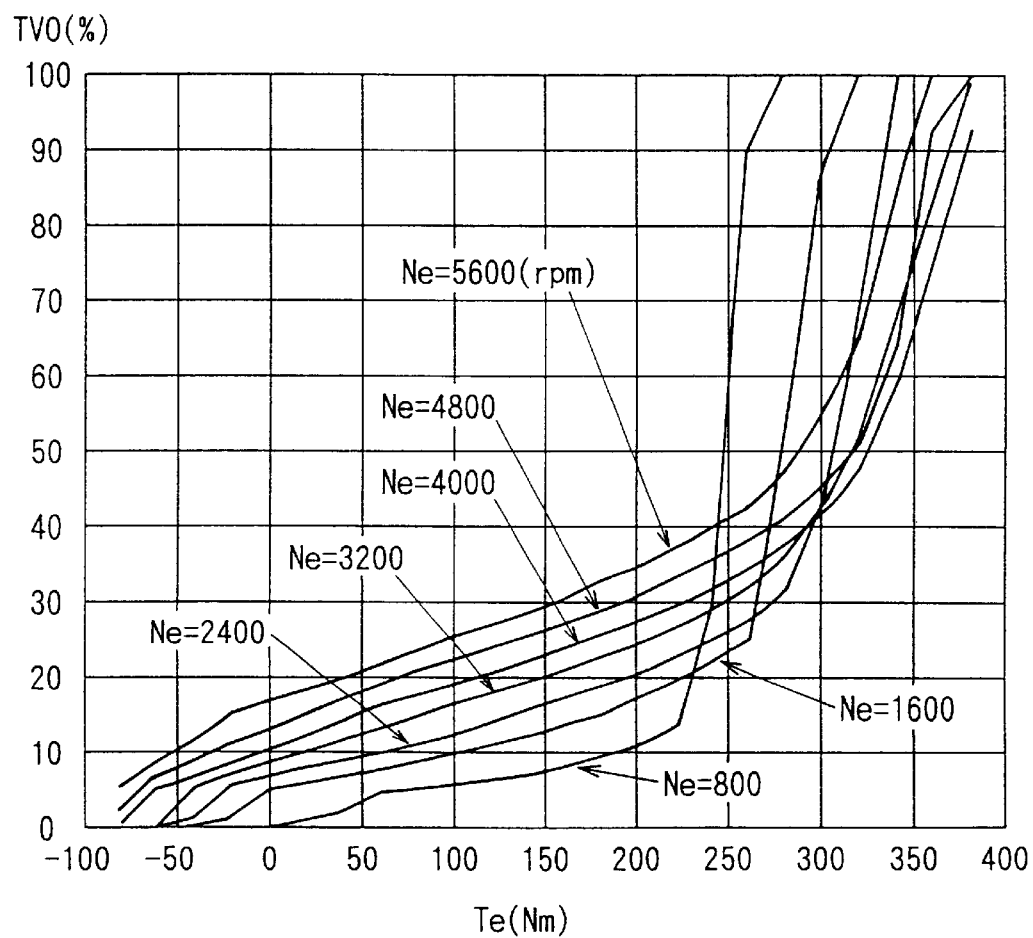
FIG. 7 is a map used to determine a throttle angle TVO from a target engine torque Te and a target engine speed Ne.

The engine control variable computing section 22 computes the target throttle angle TVO from the target engine torque Te and the target engine speed Ne according to the map of FIG. 7, which is stored in the engine ECU 20.

On the other hand, the brake control target computing section 72 computes the target brake torque generated at the braking device 6 of each wheel, to produce the operation force commanded by the system selecting section 66 by the use of the braking device 6 of each wheel.

In the present embodiment, the function of the target brake torque computing means is accomplished by the brake control target computing section 72, the target operation force computing section 64, which computes the target operation force from the target operation torque, and the system selecting section 66, which commands the operation force to be produced by brake control to the brake control torque computing section 72 on the basis of the target tire driving-baking force.

Next, the target brake torque computed by the brake control target computing section 72 is sent to the brake ECU 40, or the brake control means.

Incorporated in the brake ECU 40 are a brake controlled variable computing section 42, which computes the controlled variable of the brake (more particularly the brake oil pressure) for generating the target brake torque at the braking device 6 of each wheel, a controlled variable limiting section 44, which prevents sudden brake application, which might otherwise be caused by a malfunction of the control system by limiting the brake controlled variable computed by the brake controlled variable computing section 42 to a specific upper or lower limit, and a brake ACT command outputting section 46, which computes a command value for driving the brake ACT 12 in accordance with a brake controlled variable, the upper limit of which is limited by the controlled variable limiting section 44. The brake ACT command outputting device outputs a driving signal, which corresponds to the command value, to the brake ACT 12.

In the present embodiment, the controlled variable limiting sections 24 and 44 incorporated in the engine ECU 20 and the brake ECU 40, respectively, are limiting means.

In the vehicle driving control device of the present embodiment, as explained above, the manager ECU 50 executes a plurality of target operation torque computing sections 52 to 60, which compute the target operation torque demanded by the driver and a plurality of target operation torques for performing various kinds of driving control operations. From among the target operation torques determined by the target operation torque computing sections 52 to 60, the highest priority target operation torque is selected. Furthermore, using the target operation force determined from the selected target operation torque, a controlled system (or systems) to be used for driving control is set, and the operation force to be produced by each controlled system is allocated.

Therefore, according to the driving control device of the present embodiment, a plurality of driving control procedures, such as ACC, VSC, ABS, and the like, can be accomplished by using a single driving control device. Therefore, unlike a vehicle having a plurality of driving control devices for executing such driving control procedures, it is possible to simplify the control system and to reduce costs. Furthermore, the manager ECU 50 comprehensively determines the demand from each driving control procedure to set the system to be used in the control operation. Therefore, the vehicle driving control operation is efficient.

Furthermore, the engine control target computing section 70 estimates the condition of the lockup clutch 10 in setting the target engine torque and the target engine speed from the operation force to be produced by the engine control process. Then, the target engine torque and the target engine speed are computed in accordance with procedures (control laws) separately set by each of the conditions (disengaged, engaged, and half-engaged conditions) of the lockup clutch 10.

According to the present embodiment, therefore, it is possible to set optimum values of target engine torque and target engine speed according to the power transmission characteristics of the torque converter 8. The operation force demanded in performing the engine control can be reliably produced.

Next, the operation of the target operation torque computing section 60 will be explained.

Figure 8:
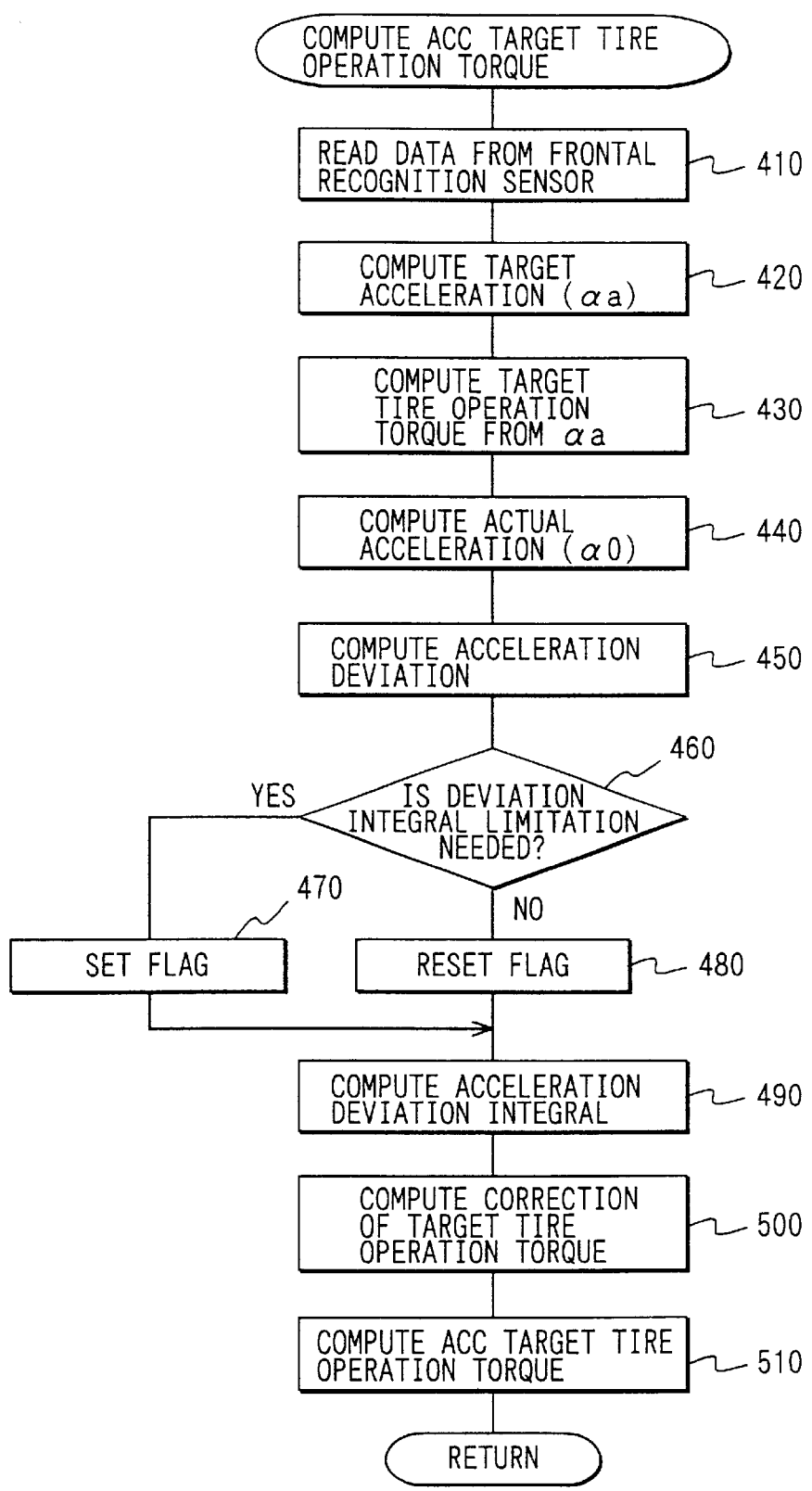
FIG. 8 is a flowchart illustrating steps executed by a target operation torque computing section, the steps of which are represented in FIG. 3.

FIG. 8 is a flowchart showing a process for computation of the ACC target operation torque. The process is executed in the target operation torque computing section 60.

As shown in FIG. 8, at the start of this process, at step 410, detection data representing the distance between leasing and trailing vehicles is read from the front recognition sensor 19. At step 420, a process is performed, based on the detection data, to compute the target acceleration αa necessary to follow the leading vehicle. At step 430, the target operation torque necessary for driving the vehicle 9 at the target acceleration αa is determined at step 420 from the target acceleration αa.

Furthermore, at step 440, the current acceleration (actual acceleration)αo of the vehicle 9 is computed on the basis of a detection signal from the G sensor 16. At a subsequent step (step 450), the deviation between the actual acceleration αo and the target acceleration αa (given at step 420) is computed.

Next, at step 460, through the process of the control value limiting section 24, which is performed by the engine ECU 20, or the process of the control value limiting section 44, which is performed by the brake ECU 40, it is determined whether the engine control variable (the throttle valve angle TVO in this embodiment) or the brake controlled variable (the brake oil pressure) has been limited or has reached a physical limit. Based on this determination, it is determined whether there is a need to limit the deviation integral in the following manner. When any one of the following conditions has been established, a demand will be issued to limit the deviation integral.

(1) The actual acceleration is less than the target value although the engine 2 has been selected by the system selecting section 66, the target acceleration is in a positive state, and the throttle valve angle TVO has reached the upper limit value.

(2) The absolute value of the actual acceleration is less than the absolute value of the target value although the engine 2 has been selected by the system selecting section 66, the target acceleration is in a negative state, and the throttle valve angle TVO has reached a fully closed position.

(3) The absolute value of the actual acceleration is greater than the absolute value of the target value although the braking device 6 has been selected by the system selecting section 66, the target acceleration is negative, and the braking pressure has reached zero.

(4) The absolute value of the actual acceleration is less than the absolute value of the target value although the braking device 6 has been selected by the system selecting section 66, the target acceleration is in a negative state, and the braking pressure has reached the upper limit value.

When there is a demand to limit the deviation integral at step 460, an acceleration deviation integral limiting flag is set at step 470. Then, step 490 is performed. When there is no need to limit the deviation integral at step 460, the acceleration deviation integral limiting flag is reset at step 480. Then, step 490 is performed.

At step 490, when the acceleration deviation integration limiting flag has been reset, the deviation integral value is computed (or updated) based on the acceleration deviation computed at step 450. On the other hand, when the acceleration deviation integration limiting flag is set, the deviation integral value is updated based on the acceleration deviation only if the acceleration deviation computed at step 450 would not cause the controlled variable to go beyond the limits of conditions (1)–(4).

Next, at step 500, a correction with respect to the target operation torque is computed by multiplying the acceleration deviation determined at step 450 by a proportionality constant and then by multiplying the updated deviation integral value (or that prohibited from being updated) at step 490 by an integral constant. Then, the resulting products are summed.

Finally at step 510, the target operation torque for ACC is computed by correcting, according to the correction computed at step 500, the target operation torque from the target acceleration αa at step 430.

At the target operation torque computing section 60, the target acceleration αa is determined as a controlled variable for following the leading vehicle. From the target acceleration αa, the target operation torque is set. Furthermore, when setting the target operation torque from the target acceleration αa, the target acceleration αa is not converted into the target operation torque, but the deviation between the target acceleration αa and the actual acceleration αo and its integral value are determined. Then, each of these parameters is multiplied by the proportionality constant and the integral constant, and the resulting products are summed to determine the correction of the target operation torque. This corrects the target operation torque.

Therefore, at the target operation torque computing section 60, it is possible to optimize the target operation torque necessary for following a leading vehicle in accordance with vehicle driving conditions (actual acceleration), to follow the leading vehicle.

When the controlled variable has been limited to an upper limit value or has reached a physical limit in the engine or the braking device, it is determined whether updating the deviation integral value will cause the control variable to go beyond the set limit or the physical limit. If so, the deviation integral is not updated.

In the situation where there is an imposed limit or a physical limit in the engine control or brake control, an increase in the deviation integral value could take place in step 490, and then the deviation computed at step 450 could be changed to cause a subsequent decrease in the controlled variable. However, in such a case, the controlled variable cannot be decreased quickly. The present invention solves this problem by preventing the renewal of the deviation integral value when it would cause the controlled variable to pass a limit (a physical limit or an imposed limit).

That is, for instance when the speed of the leading vehicle increases during uphill driving, the target acceleration will vary toward accelerating the vehicle 9 and, accordingly, the target operation torque also varies toward accelerating the vehicle 9. At this time, when the engine control variable limiting section 24 operates to limit the throttle angle, the vehicle 9 will fail to follow the leading vehicle.

Under this condition, if the updating of the deviation integral is not restricted, as it is in the present embodiment, the integral value of the deviation between the target acceleration and the actual acceleration will be updated in such a way to further increase the throttle angle. In this state, with a change of the road from uphill to downhill, the driving resistance will decrease and the vehicle 9 will start to accelerate, which will reverse the relationship of great and small between the target acceleration to the actual acceleration. However, since the deviation integral value is great, quick deceleration of the vehicle 9 cannot be performed.

However, if the updating of the deviation integral is restricted, the deviation integral value will not unnecessarily increase, which reliably prevents such problems.

A similar phenomenon arises when the control variable of the engine or the braking device is physically limited. When the engine brake is selected to decelerate the vehicle 9, the engine braking force is generated, for example, by closing the throttle valve. At this time, if the actual deceleration fails to reach the target deceleration although the throttle valve is fully closed (i.e., at a physically limited value), the deviation integral will be updated in such a way to exceed the physical limit by proportional integration. Therefore, for some time after the target acceleration is changed to a positive state, the throttle valve is held fully closed (i.e., at a physically limited value), resulting in delayed acceleration, and the vehicle occupants will experience disturbances in the vehicle operation.

However, such problems can be solved by restricting the updating of the deviation integral value.

In the process shown in FIG. 8, the process of step 410 to step 420 corresponds to a target acceleration computing means. The process of step 430 to step 510 corresponds to a converting means. Furthermore, the process of step 440 to step 500 corresponds to a torque correction computing means, and the process of step 460 to step 470 corresponds to a deviation integration prohibiting means.

Although preferred embodiments of this invention have been shown and described, it should be understood that various changes and modifications may be made to the preferred embodiments without departing from the scope of the following claims.

For example, in the engine ECU 20, it has been explained that the engine torque and the engine speed were directed to the target engine torque and the target engine speed by controlling the throttle valve angle. However, the engine control variable to be determined from the target engine torque and the target engine speed may be the quantity of fuel injected during fuel injection.

Furthermore, in the above embodiments, to realize a plurality of driving controls such as ACC, VSC, ABS, etc. by using a single driving control device, the manager ECU 50 is provided with a plurality of target operation torque computing devices correspondingly to these controls. However, this invention is applicable to the driving control section that performs specific driving control.

Furthermore, in the above embodiments comprehensive control of the engine 2, the automatic transmission 4, and the braking device 6 was explained. However, this invention is applicable even when vehicle driving control is accomplished simply through engine control.

What is claimed is:

1. A vehicle operation control device for a vehicle that includes an engine, a torque converter, which includes a lockup clutch, and a power transmission train, wherein the power transmission train extends between the torque converter and a set of wheels, the device comprising:
    a sensor for detecting an operating characteristic of the vehicle;
    a target operation torque computing means for computing a target operation torque, which is a torque necessary to operate the vehicle in a desired condition, on the basis of information from the sensor;
    a driving resistance estimating means for estimating the resistance of the vehicle to movement on the basis of information from the sensor;
    a target output torque computing means for computing the output torque of the torque converter on the basis of the target operation torque, the estimated driving resistance, and the gear ratio of the power transmission train;
    an engine control target computing means for computing a target engine torque and a target engine speed in accordance with a control law, which depends on the state of the lockup clutch, on the basis of the target output torque and the output speed of the torque converter; and
    an engine control means for controlling the engine so that the engine torque and the engine speed will be directed to the target engine torque and the target engine speed, respectively.

2. A vehicle driving control device according to claim 1, wherein the engine control target computing means comprises:
    a means for computing the target engine torque and the target engine speed when the lockup clutch is disengaged;
    a target engine speed computing means for computing the target engine speed on the basis of the target output torque, the target output speed of the torque converter, the torque ratio of the torque converter, and a capacity factor of the torque converter;
    a target engine speed slope computing means for computing a slope of variation of the target engine speed computed by the target engine speed computing means;
    a first target engine torque computing means for computing a first target engine torque on the basis of the target output torque of the torque converter and the target engine speed;
    a second target engine torque computing means for computing a second target engine torque on the basis of the slope of the target engine speed and the inertia of engine rotating members;
    a third target engine torque computing means for computing a third target engine torque, wherein the third target engine torque is based on the first target engine torque and the second target engine torque and is a target for control of the engine, wherein the target output torque and the target output speed of the torque converter are set as the target engine torque and the target engine speed, respectively, when the lockup clutch is engaged.

3. A vehicle driving control device according to claim 2, wherein the target engine speed computing means is a first target engine speed computing means for computing a first target engine speed, and wherein the engine control target computing means is provided with a second target engine speed computing means for computing a second target engine speed on the basis of the output speed of the torque converter and the degree of slippage of the lockup clutch when the lockup clutch is engaged or is held in a semi-engaged state by a lockup slippage control procedure.

4. A vehicle driving control device according to claim 1, wherein the engine control means computes at least one engine control variable, which is a target fuel injection quantity or a target throttle position, on the basis of the target engine torque and the target engine speed and controls the engine in accordance with the engine control variable.

5. A vehicle driving control device according to claim 4, wherein the target operation torque computing means includes a plurality of computing blocks for computing target operation torques corresponding to various different kinds of control procedures and selects one of the various target operation torques to control the vehicle based on the current driving conditions in accordance with predetermined criteria.

6. A vehicle driving control device according to claim 5, wherein the target operation torque computing means corrects a newly selected target operation torque, if there is a difference between an old target operation torque and the new target operation torque, so that a transition between the old target operation torque and the new target operation torque is smooth.

7. A vehicle driving control device according to claim 5, wherein the plurality of computing blocks include:
    a first computing block for determining a target operation torque demanded by the driver on the basis of the position of an accelerator pedal and the speed of the vehicle; and
    at least one of the following:
        a second computing block for computing a target operation torque for controlling the stability of the vehicle while turning;
        a third computing block for computing a target operation torque for limiting wheel slippage during brake application;
        a fourth computing block for computing a target operation torque for limiting wheel slippage during acceleration of the vehicle;
        a fifth computing block for computing a target operation torque for operating the vehicle at a constant speed; and a sixth computing block for computing a target operation torque for following a leading vehicle.

8. A vehicle driving control device according to claim 7, wherein when the target operation torque from the first computing block is selected by the target operation torque computing means, the target output torque computing means computes the target output torque of the torque converter on the basis of the selected target operation torque and the gear ratio of the power transmission train and not the driving resistance.

9. A vehicle control device according to claim 7, wherein the target operation torque computing means includes the sixth computing block, and the sixth computing block computes a target vehicle acceleration that is necessary to follow the leading vehicle on the basis of information from a front recognition sensor that detects the leading vehicle and converts the target acceleration to a target operation torque.

10. A vehicle driving control device according to claim 9, wherein the sixth computing block computes a correction for the operation torque on the basis of the target acceleration and the actual vehicle acceleration, wherein the torque correction is used to correct the target operation torque to determine a final target operation torque.

11. A vehicle driving control device according to claim 10 wherein the engine control variable has a limit that is imposed by the engine control means or that corresponds to a physical limit, and the sixth computing block determines a deviation between the target acceleration and the actual acceleration of the vehicle and determines an integral value of the deviation, and the sixth computing block further determines the sum of products resulting from multiplying the deviation by a proportionality constant and from multiplying the deviation integral value by an integration constant to produce the final target operation torque, and the sixth computing block prohibits the deviation integral value from surpassing a value corresponding to the limit.

12. A vehicle control device according to claim 1, wherein the target operation torque includes an adaptive cruise control computing block for computing a target operation torque for controlling the vehicle to follow a leading vehicle, and the adaptive cruise control computing block computes a target vehicle acceleration necessary to follow the leading vehicle on the basis of information from a front recognition sensor that detects the leading vehicle and converts the target acceleration to a target operation torque.

13. A vehicle driving control device according to claim 12, wherein the adaptive cruise control computing block computes a correction for the operation torque on the basis of the target acceleration and the actual vehicle acceleration, wherein the torque correction is used to correct the target operation torque to determine a final target operation torque.

14. A vehicle driving control device according to claim 13 wherein the engine control variable has a limit that is imposed by the engine control means or that corresponds to a physical limit, and the adaptive cruise control computing block determines a deviation between the target acceleration and the actual acceleration of the vehicle and determines an integral value of the deviation, and the adaptive cruise control computing block further determines the sum of products resulting from multiplying the deviation by a proportionality constant and from multiplying the deviation integral value by an integration constant to produce the final target operation torque, and the adaptive cruise control computing block prohibits the deviation integral value from surpassing a value corresponding to the limit.

15. A vehicle operation control device for a vehicle that includes an engine, a torque converter, which includes a lockup clutch, a brake device, and a power transmission train, wherein the power transmission train extends between the torque converter and a set of wheels and wherein the engine and the brake device are controlled independently of control manipulations performed by a driver, the device comprising:

a sensor for detecting an operating characteristic of the vehicle;

a target operation torque computing means for computing a target operation torque, which is a torque necessary to operate the vehicle in a desired condition, on the basis of information from the sensor;

a driving resistance estimating means for estimating the resistance of the vehicle to movement on the basis of information from the sensor;

a system selecting means for selecting one or both of the engine and the braking device, wherein the selected system is controlled by the vehicle operation control device;

a target brake torque computing means for computing the target brake torque on the basis of the target operation torque and the estimated driving resistance when the braking device is selected by the system selecting means;

a brake control means for controlling the braking device such that the torque produced by the braking device will be directed to the target braking torque when the target brake torque has been computed by the target brake torque computing means;

a target output torque computing means for computing the output torque of the torque converter on the basis of the target operation torque, the estimated driving resistance, and the gear ratio of the power transmission train when the engine is selected by the system selecting means;

an engine control target computing means for computing a target engine torque and a target engine speed in accordance with a control law, which depends on the state of the lockup clutch, on the basis of the target output torque and the output speed of the torque converter; and an engine control means for controlling the engine so that, when the target engine torque and the target engine speed are computed by the engine control target computing means, the engine torque and the engine speed will be directed to the target engine torque and the target engine speed, respectively.

16. A vehicle driving control device according to claim 15, wherein the engine control target computing means comprises:

a means for computing the target engine torque and the target engine speed when the lockup clutch is disengaged;

a target engine speed computing means for computing the target engine speed on the basis of the target output torque, the target output speed of the torque converter, the torque ratio of the torque converter, and a capacity factor of the torque converter;

a target engine speed slope computing means for computing a slope of variation of the target engine speed computed by the target engine speed computing means;

a first target engine torque computing means for computing a first target engine torque on the basis of the target output torque of the torque converter and the target engine speed;

a second target engine torque computing means for computing a second target engine torque on the basis of the slope of the target engine speed and the inertia of engine rotating members;

a third target engine torque computing means for computing a third target engine torque, wherein the third target engine torque is based on the first target engine torque and the second target engine torque and is a target for control of the engine, wherein the target output torque and the target output speed of the torque converter are set as the target engine torque and the target engine speed, respectively, when the lockup clutch is engaged.

17. A vehicle driving control device according to claim 16, wherein the target engine speed computing means is a first target engine speed computing means for computing a first target engine speed, and wherein the engine control target computing means is provided with a second target engine speed computing means for computing a second target engine speed on the basis of the output speed of the torque converter and the degree of slippage of the lockup clutch when the lockup clutch is engaged or is held in a semi-engaged state by a lockup slippage control procedure.

18. A vehicle driving control device according to claim 15, wherein the engine control means computes at least one engine control variable, which is a target fuel injection quantity or a target throttle position, on the basis of the target engine torque and the target engine speed and controls the engine in accordance with the engine control variable.

19. A vehicle driving control device according to claim 18, wherein the target operation torque computing means includes a plurality of computing blocks for computing target operation torques corresponding to various different kinds of control procedures and selects one of the various target operation torques to control the vehicle based on the current driving conditions in accordance with predetermined criteria.

20. A vehicle driving control device according to claim 19, wherein the target operation torque computing means corrects a newly selected target operation torque, if there is a difference between an old target operation torque and the new target operation torque, so that a transition between the old target operation torque and the new target operation torque is smooth.

21. A vehicle driving control device according to claim 19, wherein the target operation torque computing means includes:

a first computing block for determining a target operation torque demanded by the driver on the basis of the position of an accelerator pedal and the speed of the vehicle; and at least one of the following:

a second computing block for computing a target operation torque for controlling the stability of the vehicle while turning;

a third computing block for computing a target operation torque for limiting wheel slippage during brake application;

a fourth computing block for computing a target operation torque for limiting wheel slippage during acceleration of the vehicle;

a fifth computing block for computing a target operation torque for operating the vehicle at a constant speed; and a sixth computing block for computing a target operation torque for following a leading vehicle.

22. A vehicle driving control device according to claim 21, wherein when the target operation torque from the first computing block is selected by the target operation torque computing means, the target output torque computing means computes the target output torque of the torque converter on the basis of the selected target operation torque and the gear ratio of the power transmission train and not the driving resistance.

23. A vehicle control device according to claim 21, wherein the target operation torque computing means includes the sixth computing block, and the sixth computing block computes a target vehicle acceleration that is necessary to follow the leading vehicle on the basis of information from a front recognition sensor that detects the leading vehicle and converts the target acceleration to a target operation torque.

24. A vehicle driving control device according to claim 23, wherein the sixth computing block computes a correction for the operation torque on the basis of the target acceleration and the actual vehicle acceleration, wherein the torque correction is used to correct the target operation torque to determine a final target operation torque.

25. A vehicle driving control device according to claim 24 wherein the engine control variable has a limit that is imposed by the engine control means or that corresponds to a physical limit, and the sixth computing block determines a deviation between the target acceleration and the actual acceleration of the vehicle and determines an integral value of the deviation, and the sixth computing block further determines the sum of products resulting from multiplying the deviation by a proportionality constant and from multiplying the deviation integral value by an integration constant to produce the final target operation torque, and the sixth computing block prohibits the deviation integral value from surpassing a value that corresponds to the limit.

26. A vehicle driving control device according to claim 24 wherein the brake control means computes a brake control variable for controlling the braking device, and the brake control variable has a limit that is imposed by the brake control means or that corresponds to a physical limit of the braking device, and the sixth computing block determines a deviation between the target acceleration and the actual acceleration of the vehicle and determines an integral value of the deviation, and the sixth computing block further determines the sum of products resulting from multiplying the deviation by a proportionality constant and from multiplying the deviation integral value by an integration constant to produce the final target operation torque, and the sixth computing block prohibits the deviation integral value from surpassing a value that corresponds to the limit.

27. A vehicle control device according to claim 15, wherein the target operation torque includes an adaptive cruise control computing block for computing a target operation torque for controlling the vehicle to follow a leading vehicle, and the adaptive cruise control computing block computes a target vehicle acceleration necessary to follow the leading vehicle on the basis of information from a front recognition sensor that detects the leading vehicle and converts the target acceleration to a target operation torque.

28. A vehicle driving control device according to claim 27, wherein the adaptive cruise control computing block computes a correction for the operation torque on the basis of the target acceleration and the actual vehicle acceleration, wherein the torque correction is used to correct the target operation torque to determine a final target operation torque.

29. A vehicle driving control device according to claim 28 wherein the engine control variable has a limit that is imposed by the engine control means or that corresponds to a physical limit, and the adaptive cruise control computing block determines a deviation between the target acceleration and the actual acceleration of the vehicle and determines an integral value of the deviation, and the adaptive cruise control computing block further determines the sum of products resulting from multiplying the deviation by a proportionality constant and from multiplying the deviation integral value by an integration constant to produce the final target operation torque, and the adaptive cruise control computing block prohibits the deviation integral value from exceeding a value corresponding to the limit on the engine control variable imposed by the engine control means and from exceeding a value corresponding to the physical limit.

30. A vehicle driving control device according to claim 28 wherein the brake control means computes a brake control variable for controlling the braking device, and the brake control variable has a limit that is imposed by the brake control means or that corresponds to a physical limit of the braking device, and the adaptive cruise control computing block determines a deviation between the target acceleration and the actual acceleration of the vehicle and determines an integral value of the deviation, and the adaptive cruise control computing block further determines the sum of products resulting from multiplying the deviation by a proportionality constant and from multiplying the deviation integral value by an integration constant to produce the final target operation torque, and the adaptive cruise control computing block prohibits the deviation integral value from exceeding a value corresponding to the limit on the brake control variable imposed by the brake control means and from exceeding a value corresponding to the physical limit.

31. A method of controlling a vehicle comprising:
   computing a target operation torque, which is a torque necessary to operate the vehicle in a desired condition, on the basis of information from a sensor;
   estimating the resistance of the vehicle to movement on the basis of information from the sensor;
   computing a target output torque of the torque converter on the basis of the target operation torque, the estimated driving resistance, and a gear ratio of a power transmission train of the vehicle;
   computing a target engine torque and a target engine speed in accordance with a control law, which depends on the state of a lockup clutch, on the basis of the target output torque and the output speed of the torque converter; and
   controlling the engine so that the engine torque and the engine speed will be directed to the target engine torque and the target engine speed, respectively.

32. A method for controlling a vehicle according to claim 31, including computing a plurality of target operation torques corresponding to various different control procedures and selecting one of the target operation torques to control the vehicle based on the current driving conditions in accordance with predetermined criteria.

33. A method for controlling a vehicle according to claim 31, wherein the method includes a procedure for causing the vehicle to follow another, leading vehicle, and the procedure includes:
   computing a target acceleration necessary for following the leading vehicle on the basis of information from a front recognition sensor for detecting the leading vehicle; and
   computing the target operation torque based on the computed target acceleration.

34. A method for controlling a vehicle according to claim 33, wherein the procedure includes:
   generating a control variable for controlling the vehicle;
   determining a deviation between the target acceleration and the actual acceleration of the vehicle;
   multiplying the deviation by a proportionality constant;
   determining an integral value of the deviation;
   multiplying the integral value by an integral constant;
   summing the results of the multiplications to determine a correction amount; and
   correcting the target operation torque with the correction amount to generate a final target operation torque, which is used to control the vehicle.

* * * * *